United States Patent Office 3,842,067
Patented Oct. 15, 1974

---

3,842,067
SYNTHESIS OF (DES-Asn⁵)-SRIF AND
INTERMEDIATES
Dimitrios Sarantakis, Audubon, Pa., assignor to American
Home Products Corporation, New York, N.Y.
No Drawing. Filed July 27, 1973, Ser. No. 383,420
Int. Cl. A61k 27/00; C07c 103/52
U.S. Cl. 260—112.5                                    5 Claims

ABSTRACT OF THE DISCLOSURE

The tridecapepdide H-Ala-Gly-Cys-Lys-Phe-Phe-Trp-Lys-Thr-Phe-Thr-Ser-Cys-OH, its oxidized form and intermediates obtained in such synthesis are described. The tridecapeptides inhibit the secretion of the hormone somatotropin.

---

This invention relates to novel tridecapeptides and intermediates used in their synthesis by the classical method of peptide synthesis.

Somatostatin (also known as somatotropin release inhibiting factor—RSIF) is the tetradecapeptide

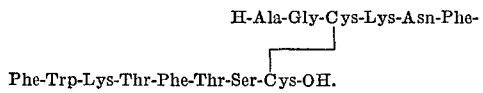

Phe-Trp-Lys-Thr-Phe-Thr-Ser-Cys-OH.

This tetradecapeptide has only recently been identified by isolation from extracts of ovine hypothalamic tissues and found to inhibit the secretion of the hormone somatotropin which is commonly referred to as the growth hormone (GH); see Brazeau et al., Science *179* pp. 77-79 (January 1973). The linear form of this tetradecapeptide H-Ala-Gly-Cys - Lys - Asn-Phe-Phe-Trp-Lys-Thr-Phe-Thr-Ser-Cys-OH, has also been reported by Brazeau et al., supra, to have been synthesized by solid phase methodology and found to have the same biological activity as the somatostatin obtained from a natural source.

The novel tridecapeptides of the present invention are analogs of somatostatin and the linear counterpart of somatostatin in which the amino acid in the five position of somatostatin has been omitted.

The nomenclature used to depict the peptides follow that shown is by Schroder & Lubke, "The Peptides," *1* pp. viii–xxix (Academic Press, 1965) and in accordance with such nomenclature, it is the *L* form of the amino acid that is intended, unless otherwise expressly indicated.

The tridecapeptides of the present invention are represented by the formula:

H-Ala-Gly - Cys-Lys-Phe-Phe-Trp-Lys-Thr-Phe-Thr-Ser-Cys-OH   (I)

and its oxidized form

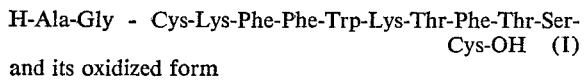
(II)

and the non-toxic acid addition salts of such compounds.

Illustrative of acid addition salts are hydrochloride, hydrobromide, sulfate, phosphate, maleate, acetate, citrate, benzoate, succinate, malate, ascorbate, and the like.

The present invention also relates to novel intermediates of the formula:

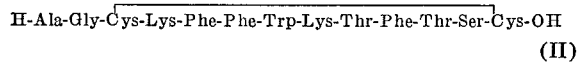

wherein:

R is either hydrogen or an α-amino protecting group. The α-amino protecting groups contemplated by R are those known to be useful in the art in the step-wise synthesis of polypeptides. Among the classes of α-amino protecting groups covered by R are (1) acyl type protective goups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethane type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl, (3) aliphatic urethan protecting groups illustrated by *tert*-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R is *tert*-butyloxycarbonyl;

R¹ is a protecting group for the sulfhydryl group on the cysteinyl amino acid residue in the tridecapeptide. Illustrative of R¹ is a group selected from the class consisting of benzyl; substituted benzyl wherein the substituent is at least one of methyl, methoxy, nitro (e.g. p-methylbenzyl, p-nitrobenzyl, 2,4,6-trimethylbenzyl, etc.); carboxymethyl; trityl, benzyloxycarbonyl, benzhydryl, p-methoxybenzyloxycarbonyl, benzylthiomethyl, ethylcarbonyl, thioethyl, tetrahydropyranyl, acetamidomethyl, benzoyl, sulfate salt, etc.

R² is a protecting group for the side chain amino substituent of lysine or R² is hydrogen which means there is no protecting group on the side chain amino subsituent. Illustrative of suitable side chain amino protecting groups are benzyl, chlorobenzyloxycarbonyl, benzyloxycarbonyl, tosyl, 2,4-dinitrophenyl, t-amyloxycarbonyl, t-butyloxycarbonyl, etc. The selection of such a side chain amino protecting group is not critical except that it must be one which is not removed during cleavage of the α-amino protecting group during the synthesis until the peptide of the desired amino acid sequence is obtained. Hence, the α-amino protecting and side chain amino protecting group cannot be the same;

R³ and R⁴ are protecting groups for the alcoholic hydroxyl group of threonine and serine and is selected from the class consisting of acetyl, tosyl, benzoyl, *tert*-butyl, trityl, benzyl and benzyloxycarbonyl. The preferred protecting group is benzyl; or R³ and R⁴ is hydrogen which means there is no protecting group on the alcoholic hydroxyl function; the selection of these protecting groups is not critical except that it must be one which is not removed during cleavage of the α-amino protecting group during the synthesis until the peptide of the desired amino acid sequence is obtained;

R⁵ is α-carboxyl protecting group which is stable under the process conditions used to remove the α-amino protecting group until the peptide of the desired chain length has been formed. Illustrative of R⁵ is a group selected from the class consisting of $C_1$–$C_6$ alkyl (e.g. methyl, ethyl, butyl, pentyl, isobutyl, etc.); benzyl; substituted benzyl wherein the substituent is selected from at least one of nitro, methoxy and methyl (e.g. p-methoxybenzyl, p-nitrobenzyl, 2,4-dimethoxybenzyl, 2,4,6-trimethylbenzyl, pentamethylbenzyl), phenacyl, phthalimidomethyl, β-methylthioethyl, 4-picolyl and 4-(methylthio)phenyl. Preferably R⁵ is $C_1$–$C_6$ alkyl, benzyl or substituted benzyl.

The tridecapeptides of formulas I and III are prepared in accordance with the reaction scheme shown in the flow diagram appended hereto. With reference to such flow diagram, R-Thr(R³)-Ser(R⁴)-OH (A) is reacted with a carboxyl group activating reagent to form a carboxyl group activated derivative of Formula (A) which is then coupled with a carboxylic acid ester of cysteine (Formula B) at a temperature between about −30° C. and +30° C. to form a compound of Formula C. The compound of Formula B, which is preferably in the form of a salt, may be present in the reaction medium while the carboxyl group activated derivative of a compound of Formula (A) is being formed or it may be added to the reaction vessel after the activated compound has been formed. The coupling is carried out throughout the synthesis in the presence of an inert organic solvent such as dichloromethane, acetonitrile, dimethylformamide, chloroform, dioxane, toluene, methylene chloride, etc. If the compound of Formula B is added to the reaction medium as an acid addition salt, an acid acceptor is included in the reaction medium so that a free base is formed in situ which reacts with the activated derivative of a compound of Formula A. Suitable acid acceptors include tertiary amines (e g. triethylamine, pyridine, quinoline, dimethylaniline, etc.) alkali metal carbonates or other acid binding agents known in the art.

Following the formation of a compound of formula (C), the α-amino protecting group on threonine is then cleaved to yield the tripeptide of formula (D). The cleaving reagent is one which will remove the α-amino protecting group without cleavage of the side chain protecting groups. A particular suitable reagent is trifluoroacetic acid which will cleave tert-butyloxycarbonyl off the α-amino group but not benzyl or substituted benzyl side chain protecting groups. Other standard cleaving reagents are described by Schroeder and Lubke, supra, pp. 72–74.

The tripeptide of formula (D) is then coupled with the dipeptide of formula (E) after the free carboxyl group of the latter has been activated as previously described, this reaction being carried out in the same manner as described in connection with the formation of the tripeptide of formula (C). Following the formation of the pentapeptide of formula (F), the α-amino protecting group is cleaved off threonine using trifluoroacetic acid or other suitable cleaving reagent to form a compound of formula (G), which may be in the form of a salt, depending on the nature of the cleaving reagent used. This pentapeptide is coupled with a carboxyl group activated derivative of a compound of formula (H) to obtain the nonapeptide of formula (J) which is then treated with a suitable cleaving reagent such as trifluoroacetic acid to form a salt of a compound of formula (K). This nonapeptide is then coupled with a tetrapeptide of formula (L) which has its carboxyl group activated with a carboxyl group activating reagent to form the tridecapeptide of formula (M). Thereafter, the side chain protecting groups $R^1$, $R^2$, $R^3$ and $R^4$ and the α-amino protecting group are cleaved and the ester is converted to the corresponding acid as represented by formula (I). The cleavage of the side chain protecting groups, α-amino protecting group and formation of the free acid may be accomplished in a single step or may be performed stepwise depending on the selection of the cleaving reagent. A particular suitable reagent is liquid hydrogen fluoride. If desired trifluoroacetic acid can be used to remove the α-amino protecting group following by hydrogenation over a palladium catalyst to split off such side chain protecting groups as benzyl and benzyloxycarbonyl, or sodium in liquid ammonia may be used.

As previously indicated, the activating reagents used in the aforedescribed synthesis are those well known in the peptide art. Illustrative of these are: (1) carbodiimides (e.g. N,N$^1$-dicyclohexycarbodiimide, N-ethyl N$^1$-(γ-dimethylamino propyl carbodiimide); (2) cyanamides (e.g. N,N-dibenzylcyanamide); (3) keteimines; (4) isoxazolium salts (e.g. N-ethyl-5-phenyl isoxazolium-3$^1$-sulfonate); (5) monocyclic nitrogen containing heterocyclic amides of aromatic character containing one through four nitrogens in the ring such as imidazolides, pyrazolides, 1,2,4-triazolides. Specific heterocyclic amides that are useful include N,N$^1$-carbonyl diimidazole, N,N$^1$-carbonyl-di-1,2,4-triazole; (6) alkoxylated acetylene (e.g. ethoxyacetylene); (7) reagents which form a mixed anhydride with the carboxyl moiety of the amino acid (e.g. ethylchloroformate, isobutylchloroformate) and (8) nitrogen-containing heterocyclic compounds having a hydroxy group on one ring nitrogen (e.g. N-hydroxyphthalimide, N-hydroxysuccinimide, 1 - hydroxybenzotriazole). Other activating reagents and their use in peptide coupling are described by Schroeder and Lubke supra, in Chapter III and by Kapoor, J. Pharm. Sci., 59, pp. 1–27 (1970).

A particular suitable activating system for a compound of formula (A) is the use of the combination of N,N$^1$-dicyclohexylcarbodiimide (DCC) and N-hydroxybenzotriazole which minimizes racemization. In subsequent activating and coupling reactions, the combination of DCC and N-hydroxysuccinimide is preferred.

In selecting a particular side chain protecting group to be used in the synthesis of the peptides of formula (I), the following rules should be followed: (a) the protecting group must be stable to the reagent and under the reaction conditions selected for removing the α-amino protecting group at each step of the synthesis, (b) the protecting group must retain its protecting properties (i.e. not be split off under coupling conditions), and (c) the side chain protecting group must be removable upon the completion of the synthesis containing the desired amino acid sequence under reaction conditions that will not alter the peptide chain.

A compound of formula (II) is obtained by air oxidation of a compound of formula (I). This reaction is preferably carried out by surface oxidation as described in Example 24.

The following examples are illustrative of the process for obtaining the peptides described and claimed herein.

EXAMPLE 1

N-t-butyloxycarbonyl-L-alanylglycine benzyl ester

To a solution of t-Boc-L-Ala (18.9 g., 0.1 mole) and N-methylmorpholine (11.2 ml., 0.1 mole) in tetrahydrofuran (100 ml.) at −20° C. is added iso-butyl chloroformate (13.1 ml., 0.1 mole) being careful to keep the temperature below −15° C. After 15 minutes, a cold dimethylformamide solution of Gly-OBzl-p-tosylate (33.7 g., 0.1 mole) which had been adjusted to pH 7.5 by the addition of N-methylmorpholine (11.2 ml., 0.1 mole) is added, and the temperature allowed to rise to 0° C. The stirring is continued at 0° C. for 2 hours, then at ambient temperature overnight. The filtered reaction solution is concentrated in vacuo, the residue taken up in ethyl acetate, and washed consecutively with $KHSO_4$ (5%), $KHCO_3$ (5%), and saline. After drying over $Na_2SO_4$, the solution is concentrated in vacuo to a solid and recrystallized by taking up in hot ethyl acetate-ether (1:10) and adding hexane to cloud. A white crystalline solid is obtained in a yield of 29.89 (88%); m.p. 87–90; $[\alpha]_D^{25}=-27.98$ (c. 1.037, MeOH); $R_f$ (chloroform-methanol, 25:1) 0.67; UV and $I_2$ positive.

Analysis.—Calc. for $C_{17}H_{24}N_2O_5$ (33.38): C, 60.70; H, 7.19; N, 8.33. Found: C, 60.51; H, 7.45; N, 8.42.

EXAMPLE 2

N-t-butyloxycarbonyl-L-alanylglycine t-Boc-L-Ala-Gly-Obzl (29 g., 86 mmoles) of Example 1 is dissolved in MeOH (50 ml.) and N sodium hydroxide (87 ml.) is added. After 3 hours at ambient temperature, N-hydrochloric acid is added to adjust the solution to pH 6.5; the solution is then concentrated in vacuo to a small volume, water added (200 ml.), cooled in an ice bath and adjusted to pH 3 with N-hydrochloric acid. An oil precipitates and rapidly crystallizes; it is filtered and washed with water, then dried in vacuo over KOH leaving a white solid, 16.1 g. (76%); m.p. 108–111°; $[\alpha]_D^{25}=-25.65$ (c. 0.976, MeOH); $R_f$ (n-butanol-water-acetic acid, 4:1:1) 0.78; $I_2$ and chlorine peptide spray positive.

*Analysis.*—Calc. for $C_{10}H_{18}N_2O_5 \cdot H_2O$ (264.28); C, 45.44; H, 7.63; N, 10.60. Found: C, 44.88; H, 8.11; N, 10.62.

EXAMPLE 3 t-Butyloxycarbonyl-L-alanylglycyl-S-methoxybenzyl-L-cysteine benzyl ester

A dimethylformamide solution of L-Cys-(SMBzl)-OBzl p-tosylate (32.7 g., 65 mmoles) is carefully adjusted to pH 7 with triethylamine (ca. 9.0 ml., 65 mmoles). t-Boc-L-Ala-Gly-OH (16 g., 65 mmoles) of Example 2 is added to the solution and it is cooled to 0° C. DCC is added and the stirred mixture was kept at 0° C. for two hours, and then at ambient temperature for 18 hours. The filtered reaction solution is concentrated in vacuo, and the residue taken up in ethyl acetate. After filtering off more dicyclohexyl-urea (DCU), the ethyl acetate solution is washed consecutively with N citric acid, $KHCO_3$ (5%), and water, and dried over $Na_2SO_4$. On concentrating in vacuo an oil is obtained, which is crystallized from methanol-ether to give a white solid in a yield of 25.4 g. (70%) of the above-titled product; m.p. 126–127°; $[\alpha]_D^{25} = -43.93$ (c. 0.982, MeOH); $R_f$ (chloroform-methanol, 25:1) 0.35; UV and $I_2$ positive.

*Analysis.*—Calc. for $C_{28}H_{37}N_3O_7S$ (559.60): C, 60.09; H, 6.66; N, 7.51. Found: C, 60.88; H, 7.17; N, 7.86.

EXAMPLE 4 t-Butyloxycarbonyl-L-alanylglycyl-S-methoxybenzyl-L-cysteine t-Boc-L-Ala-Gly-L-Cys(SMBzl)-OBzl (12.0 g., 21.4 mmoles) of Example 3 is dissolved in methanol-dioxane (100 ml., 3:1) and N sodium hydroxide (23 ml.) is added and left at ambient temperature for three hours. After adjusting to pH 6.5 with N-hydrochloric acid, the solution is concentrated in vacuo to a small volume, water added (100 ml.), cooled in an ice bath, and acidified to pH 3 with N-hydrochloric acid. The oil which precipitates is extracted into ethyl acetate and washed with saline, then dried over $Na_2SO_4$ and concentrated in vacuo to an oil. The oil is crystallized from ethyl acetate-ether-n-pentane to give a white solid in a yield of 9.2 g. (92%) of the above-titled product; m.p. 112–120°;

$$[\alpha]_D^{25} = -25.60$$

(c. 0.967, MeOH); $R_f$ (n-butanol-water-acetic acid, 4:1:1) 0.72; UV and chlorine peptide spray positive.

*Analysis.*—Calc. for $C_{21}N_{31}N_3O_7S$ (469.5): C, 53.72; H, 6.66; N, 8.95. Found: C, 54.79; H, 6.97; N, 8.97.

EXAMPLE 5 t-Butyloxycarbonyl-L-alanylglycyl-S-methoxybenzyl-L-cysteinyl-$N^\epsilon$-benzyloxycarbonyl-L-lysine methyl ester A dimethylformamide solution of t-Boc-L-Ala-Gly-L-Cys(SMBzl)-OH (8.45 g., 18 mmoles) and N-hydroxysuccinimide (2.07 g., 18 mmoles) is cooled to 0° C. Then DCC (3.92 g., 19 mmoles) is added and the mixture stirred for 15 minutes. A cool dimethylformamide solution of L-Lys($N^\epsilon$Cbz)-OMe hydrochloride (5.93 g., 18 mmoles) which has been adjusted to pH 7 with triethylamine (2.50 ml., 18 mmoles) is then added, and the mixture stirred at 0° C. for two hours and at ambient temperature overnight. The filtered reaction solution is concentrated in vacuo, and the residue taken up in ethyl acetate. After washing consecutively with $KHSO_4$ (5%), $KHCO_3$ (5%), and saline, and drying over $Na_2SO_4$, the solution is concentrated in vacuo to an oil. The oil is taken up in ethyl acetate and a slightly gelatinous solid precipitates with ether-n-pentane which is recrystallized from ethyl acetate-ether-n-pentane to yield 10 g. (75%) of the above-titled product; m.p. 78–81°; $[\alpha]_D^{25} = -31.55$ (c. 1.006, MeOH); $R_f$ (chloroform-methanol, 9:1) 0.90; UV and $I_2$ positive.

*Analysis.*—Calc. for $C_{36}H_{51}N_5O_{10}S$ (745.89); C, 57.98; H, 6.89; N, 9.39. Found: C, 56.87; H, 7.06; N, 9.06.

EXAMPLE 6 t-Butyloxycarbonyl-L-alanylglycyl-S-methoxybenzyl-L-cysteinyl-$N^\epsilon$-benzyloxycarbonyl-L-lysine t-Boc-L-Ala-Gly-L-Cys(SMBzl)-L-Lys($N^\epsilon$Cbz)-OMe (10 g., 13.4 mmoles) of Example 5 is dissolved in methanol (40 ml.) and N sodium hydroxide (14 ml.) added. After three hours at ambient temperature, the solution is neutralized with N-hydrochloric acid, and concentrated in vacuo to a small volume. The residue is taken up in water (100 ml.), cooled in an ice bath, and acidified to pH 3 with N-hydrochloric acid. The white solid which precipitates is filtered off and washed with water, then dried in vacuo over KOH. Recrystallization from ethyl acetate-ether gives a slightly gelatinous white solid in a yield of 7.50 g. (77%) of the above-titled product. A second crop of equal purity is obtained on adding n-pentane to the above mother liquor in a yield of 1.26 g. (13%) [total yield 8.76 g. (90%)]; m.p.=85–90°; $[\alpha]_D^{25} = 26.19$ (c. 1.05, MeOH); $R_f$ (n-butanol-water-acetic acid, 4:1:1) 0.90; UV and chlorine peptide spray positive.

*Analysis.*—Calc. for $C_{35}H_{49}N_5O_{10}S \cdot H_2O$ (749.9): C, 56.07; H, 6.85; N, 9.34. Found: C, 56.10; H, 6.91; N, 9.37.

Amino acid analysis: Ala 1.00, Gly 1.00, Cys .61, Lys 1.01.

EXAMPLE 7

N-tert-butyloxycarbonyl-L-phenylalanyl-L-Phenyalanine methyl ester

Boc-Phe-OH (53 gr., 0.2 mole) is dissolved in a mixture of tetrahydrofuran-dimethylformamide (1:1) (500 ml.), mixed with N-methylmorpholine (22 ml.) and cooled at —15° C., then isobutylchloroformate (27 ml.) is added under stirring. The reaction mixture is stirred for 7 minutes and then a solution of PheOMe·HCl (44 gr., 0.2 mole) and N-methylmorpholine (22 ml.) in dimethylformamide is added and the mixture is allowed to reach room temperature overnight.

The triethylamine hydrochloride salt which separates is filtered out and the filtrate is evaporated to a small volume. The residue is treated with an excess of water to give an oily compound which crystallizes after 30 minutes. The crystalline solid is washed on the filter with 5% $KHSO_4$, water, 5% $KHCO_3$, water and dried to afford a solid in a yield of 80 gr. (96%) of the above-titled product; $R_f$ (EtOAc-hexene, 1:1) 0.90.

*Analysis.*—Calc. for $C_{24}H_{30}N_2O_5$ (426.5): C, 67.59; H, 7.09; N, 6.56. Found: C, 67.09; H, 6.97; N, 6.63.

EXAMPLE 8

N-tert-butyloxycarbonyl-L-phenylalanyl-L-phenylalanine

BOC-Phe-Phe-OMe (122 gr., 0.29 mole) of Example 7 is dissolved in methanol-dioxane-acetone (ca. 1000 ml., 1:1:1) and treated with 1 N sodium hydroxide solution for 3 hours. The basic solution is neutralized with dilute hydrochloric acid (pH 7) and then most of the organic solvent is removed in vacuo. The residue is diluted with water and acidified with 5% $KHSO_4$ aqueous, to afford a crystalline solid which is washed with water and dried to yield 73 gr. (62%) of the above-titled product; m.p. 93–95° C.

*Analysis.*—Calc. for $C_{23}H_{28}N_2O_5$ (412): C, 66.99; H, 6.80; N, 6.80. Found: C, 66.62; H, 6.68; N, 6.78.

EXAMPLE 9

N-tert-butyloxycarbonyl-L-phenylalanyl-L-phenylalanyl-L-tryptophan methyl ester

BOC-Phe-Phe-OH (41.2 gr., 0.1 mole) of Example 8 is dissolved in dimethylformamide-tetrahydrofuran (250 ml., 1:1) and mixed with N-hydroxysuccinimide (14 gr.), then Trp-OMe·HCl (25.45 gr., 0.1 mole) and triethylamine (13.9 ml.). The mixture is cooled in an ice bath and treated with DCC (21 gr., 0.12 mole) for 2 hours in the ice-bath then overnight at room temperature. The DCU which separates is filtered off and the filtrate is concentrated to half its volume then an excess of water is added to afford a gummy solid which is taken in EtOAc and washed with 5% $KHSO_4$, water, 5% $KHCO_3$, water, dried over $Na_2SO_4$ and evaporated to dryness. The residue is solidified from $EtOAc$-$Et_2O$-hexane, then from hexane, to afford a powder in a yield of 57 gr. (93%) of the above-titled product. $R_f$ (EtOAc-heptane) 0.55 and an impurity at 0.05.

A portion of this material (10 gr.) is chromatographed through a column of silica gel (4.5 x 55 cm.) and eluted with EtOAc-hexane (1:1) to give a white solid, 6.4 gr. (64%) chromatographically, homogeneous. M.P. 113–116° dec.

*Analysis.*—Calc. for $C_{35}H_{40}N_4O_6$ (612.7): C, 68.61; H, 6.58; N, 9.15. Found: C, 68.74; H, 6.70; N, 9.32.

EXAMPLE 10

N-tert-butyloxycarbonyl-L-phenylalanyl-L-phenylalanyl-L-tryptophan

BOC-Phe-Phe-Trp-OMe (5.5 gr., 9 mmoles) is dissolved in methanol (25 ml.) and treated with 1 N N-NaOH (12 ml.) for 3 hours at room temperature. The organic solvent is evaporated to a small volume and the residue is diluted with water then acidified with 5% $KHSO_4$ to give a white precipitate which is filtered, washed with water and dried. Yield is 5 gr. (93%); $R_f$ ($CHCl_3$-MeOH-AcOH, 85:10:5) 0.80, trace at 0.05; m.p. 140–142°.

*Analysis.*—Calc. for $C_{34}H_{38}N_4O_6 \cdot 3H_2O$ (652.6): C, 62.56; H, 6.79; N, 8.57. Found: C, 62.52; H, 6.03; N, 8.76.

EXAMPLE 11

N - tert-butyloxycarbonyl-L-phenylalanyl-L-phenylalanyl-L-tryptophyl-$N^\epsilon$-benzyloxycarbonyl - L - lysine methyl ester Boc-Phe-Phe-Trp-OH (10 gr., 16.7 mmoles) of Example 10 is mixed with Lys(CBZ)OMe·HCl salt (5.6 gr., 17 mmoles) in dimethylformamide (150 ml.) and triethylamine (2.32 ml.) is added followed by N-hydroxysuccinimide (2.3 gr.). The mixture is cooled in an ice-bath then DCC (4.12 gr.) is added under stirring. It is kept for two hours in the ice-bath and for 20 hours at room temperature after which time the DCU which separates is filtered off and the filtrate is treated with an excess of water to precipitate a gummy material. This material is taken in EtOAc and the organic phase is washed with 5% citric acid, brine, 5% $Na_2CO_3$, brine, and dried over $Na_2SO_4$ for a short time then concentrated to a small volume and treated with an excess of $Et_2O$ to afford a crystalline solid in a yield of 11.7 gr. (80%) of the above-titled product; m.p. 159–160°; $R_f$ ($CHCl_3$-MeOH-AcOH, 85:10:5) 0.75.

EXAMPLE 12

N - tert-butyloxycarbonyl-L-phenylalanyl-L-phenylalanyl-L-tryptophyl-$N^\epsilon$-benzyloxycarbonyl-L-lysine BOC-Phe-Phe-Trp-Lys(Cbz)OMe (8.8 gr., 10 mmoles) of Example 11 is dissolved in a mixture of methanol-acetone (150 ml., 1:1) and treated with 1 N-NaOH (12 ml.) for 6 hours at room temperature. Acidification with 10% citric acid (200 ml.) gives a solid which is filtered and washed with water thoroughly to yield 8.5 gr. (99%) of the above-titled product; m.p. 166–168°. $[\alpha]_D^{25}=-8.91$ (c. 1, DMF); $R_f$ ($CHCl_3$-MeOH, 10:1) 0.30 $R_f$ (n-butanol-water-pyridine-acetic acid 30:24:20:6) 0.90.

*Analysis.*—Calc. for $C_{48}H_{56}N_6O_9$ (860.9): C, 66.69; H, 6.56; N, 9.76. Found: C, 66.39; N, 6.63; N, 9.63.

EXAMPLE 13

N-t-butyloxycarbonyl-O-benzyl-L-threonyl-L-phenylalanine methyl ester

A solution of Boc-L-Thr(Bzl)-OH (61.8 g., 0.2 mole) and N-methylmorpholine (22.4 ml., 0.2 mole) in tetrahydrofuran is cooled to $-15°$ C. Isobutylchloroformate (26.2 ml., 0.2 mole) is added in portions, keeping the temperature between $-15°$ C. and $-10°$ C. After stirring at $-15°$ C. for 15 minutes, a cold mixture of L-Phe-Me·HCl (43.1 g., 0.2 mole) and N-methylmorpholine (224 ml., 0.2 mole) in dimethylformamide is added in portions keeping the temperature between $-10°$ C. and $-5°$ C. The mixture is stirred at 0° C. for two hours, and then at room temperature overnight. The filtered reaction mixture is concentrated *in vacuo*, and the residue taken up in ethyl acetate. The ethyl acetate solution is washed consecutively with 5% $KHSO_4$, 5% $KHCO_3$, saline, and dried over $Na_2SO_4$. After concentrating in vacuo an oil is obtained which crystallizes on standing. The solid is recrystallized from isopropyl ether-hexane to yield 74.9 g. (80%) of the above-titled product; m.p. 78–81°; $[\alpha]_D^{25}=10.75$ (c. 1.023, MeOH); $R_f$ ($CHCl_3$) 0.35.

*Analysis.*—Calc. for $C_{26}H_{34}N_2O_6$ (470.55): C, 66.36; H, 7.28; N, 5.95. Found: C, 66.72; H, 7.32; N, 5.85.

EXAMPLE 14

N-t-butyloxycarbonyl-O-benzyl-L-threonine-L-phenylalanine

BOC-Thr(Bzl)-Phe-OMe (23.5 gr., 0.05 mole) of Example 13 is dissolved in a mixture of MeOH-dioxane (100 ml., 1:1) and treated with 1 N-NaOH (55 ml.) for 3 hours (until starting material cannot be detected by TLC). Most of the solvent is evaporated in vacuo and the residue is diluted with water then it is acidified with 5% citric acid. The gum which separates is taken in EtOAc and washed with water (brine) then evaporated to dryness. The residue is crystallized from $Et_2O$-hexane to yield 19.8 gr. (87%) of the above-titled product; m.p. 118–119°; $R_f$ (chloroform-methanol-glacial acetic acid, 85:10:5) 0.80.

EXAMPLE 15

N-tert-butyloxycarbonyl-O-benzyl-L-threonyl-O-benzyl-L-serine methyl ester

N-tert-butyloxycarbonyl-O-benzyl - L - threonine (30.9 gr., 0.1 mole) is dissolved in dry tetrahydrofuran (200 ml.) cooled at $-20°$ C. and treated with N-methylmorpholine (11 ml.) followed by isobutylchloroformate (13.4 ml.). The cold reaction mixture is stirred for 5 minutes at $-20°$ C. then treated with a solution of O-benzyl-L-serine methyl ester hydrochloride (25 g., ca. 0.1 mole) containing N-methylmorpholine (11 ml.), in dimethylformamide, and the mixture is allowed to reach room temperature overnight.

The solvent is removed in vacuo and the residue is partioned between water-ethyl acetate. The organic phase is washed with 5% citric acid, water, aq. $KHCO_3$, water and dried over $MgSO_4$, then evaporated to dryness to afford an oily residue which crystallizes from ethyl ether-hexane to a jelly like solid in yield of 29 gr.; $R_f$ ($CHCl_3MeOH$, 25:1) 0.85 $R_f$ (EtOAc-hexane, 1:1) 0.65.

EXAMPLE 16

N-tert-butyloxycarbonyl-O-benzyl-L-threonyl-O-benzyl-L-serine

BOC-Thr(Bzl)-Ser(Bzl)-OMe (28.2 gr., 0.0563 mole) of Example 15 is dissolved in methanol (ca. 50 ml.) and treated with 1 N sodium hydroxide (75 ml.) for 1.5 hours at room temperature. The alkaline solution is neutralized to pH 7 with 10% citric acid and most of the methanol is removed in vacuo. The residue is diluted with some water and acidified with 5% aq. KHSO₄ then extracted with EtOAc. The organic phase is washed with H₂O dried over Na₂SO₄ and evaporated to dryness to an oil. The yield is quantitative; $R_f$ (EtOAc-hexane, 1:1) 0.15 (long spot).

EXAMPLE 17

N-tert-butyloxycarbonyl-O-benzyl-L-threonyl-O-benzyl-L-Seryl-S-p-methoxybenzyl-L-systeine benzyl ester BOC-Thr(Bzl)-Ser(Bzl)-OH (24.3 gr., 50 mmoles) of Example 16 is dissolved in acetonitrile and dichloromethane (250 ml., 2:3) and is mixed with HCys(SMBzl)OBzl-TosOH (25 gr., 50 mmoles), then with triethylamine (6.8 ml.) and N-hydroxybenzotriazole (6.8 gr.) and the mixture is cooled in an ice-bath.

A solution of DCC (11 gr., 53 mmoles) in acetonitrile (50 ml.) is added and the reaction mixture is stirred for two hours in the cold then for 2 days at room temperature. The DCU which separates is filtered off and the filtrate is evaporated to dryness. The oily residue is partitioned between ethyl acetate-water and the organic phase is washed with 10% citric acid, water, KHCO₃, brine and dried over Na₂SO₄. The solvent is evaporated and the oily residue is crystallized from Et₂O-hexane to afford a white solid in a yield of 24.5 gr. of the above-titled product; m.p. 87–90°; $[\alpha]_D^{25} = -14.7$ (c. 0.98, DMF); $R_f$ (chloroform-methanol, 25:1) 0.54 traces at 0.4 and 0.3; (heptane-EtOAc, 1:1) 0.64, traces at 0.25; I₂ positive.

*Analysis.*—Calc. for $C_{44}H_{52}N_3SO_9$ (798.9): C, 66.15; H, 6.56; N, 5.26. Found: C, 66.22; H, 6.95; N, 5.29.

EXAMPLE 18

O-benzyl-L-threonyl-O-benzyl-L-seryl-S-p-methoxybenzyl-L-cysteine benzyl ester, trifluoroacetate BOC-Thr(Bzl)-Ser(Bzl)-Cys(SMBzl)-OBzl (8 gr., 10 mmoles) of Example 17 is mixed with anisole (100 mmoles) and treated with trifluoroacetic acid (100 ml.) for 45 minutes. The solvent is evaporated in vacuo and the residue is dissolved in dry Et₂O, then evaporated to dryness in high vacuo to give an oily compound in a yield of 7.2 gr. (90%) of the above-titled product. $R_f$ (BWA, 4:1:1) 0.9; $R_f$ (heptane-EtOAc) 0.0–0.1 long spot, I₂ positive and Ninhydrin positive.

EXAMPLE 19

N-tert-butyloxycarbonyl-O-benzyl-L-threonyl - L - phenylalanyl-O-benzyl-L-threonyl-O-benzyl-L-seryl - S - p-methoxy benzyl-L-cysteine benzyl ester BOC-Thr(Bzl)-Phe-OH (9.2 gr., 20 mmoles) of Example 14 is dissolved in dimethylformamide (100 ml.) and mixed with N-hydroxysuccinimide (3.4 gr.) and a solution of Thr(Bzl)-Ser(Bzl)-Cys(SMBzl)OBzl. TFA salt (20 mmoles) of Example 18 in dimethylformamide (20 ml.) is neutralized with triethylamine to pH 7. The mixture is cooled in an ice-bath and treated with DCC (4.5 gr.) for two hours in the cold then for 2 days at room temperature. The DCU is filtered and the filltrate evaporated to dryness. The residue is triturated with water to give a precipitate which is taken in EtOAc, washed with 5% citric acid, water 5% Na₂CO₃, water dried over Na₂SO₄ and evaporated to dryness. The residue is solidified from Et₂O-hexane to yield 17.3 gr. (70%) of the above-titled product; m.p.=105–107°; $[\alpha]_D^{25}=3.6$ (c. 1, DMF); $R_f$ (CHCl₃-MeOH, 10:1) 0.90.

*Analysis.*—Calc. for $C_{64}H_{75}N_5SO_{12}H_2O$ (1156.2): C, 66.46; H, 6.71; N, 6.05. Found: C, 66.68; H, 6.59; N, 6.20.

EXAMPLE 20

N-tert-butyloxycarbonyl-L-phenylalanyl-L - phenylalanyl-L-tryptophyl-Nᵉ-benzyloxycarbonyl-L-lysyl-O - benzyl-L-threonyl-L-phenylalanyl-O-benzyl - L - threonyl - O-benzyl-L-seryl-S-p-methoxybenzyl - L - cysteine benzyl ester BOC-Thr(Bzl)-Phe-Thr(Bzl)-Ser(Bzl) - Cys(SMBzl)- OBzl (11.4 gr., 10 mmoles) of Example 19 is mixed with 200 mmoles anisole (20 ml.) and treated with trifluoroacetic acid (200 ml.) for 30 minutes in an ice-bath and for 30 minutes further at room temperature, then the mixture is evaporated to dryness in high vacuo and the residue triturated with an excess of dry Et₂O-pentane to afford a solid in a yield of 11 gr. (95%) of the above-titled product; $R_f$ (CHCl₃-MeOH-AcOH, 85:10:5) 0.55, trace at 0.45.

The above solid (9.37 gr., 8.14 mmoles) is dissolved in DMF (ca. 150 ml.) and neutralized with triethylamine (1.14 ml.) then mixed with BOC-Phe-Phe-Trp-Lys-(Cbz)-OH (7 gr., 8.14 mmoles) of Example 12 and N-hydroxysuccinimide (1.035 gr.) and the mixture is cooled in an ice-bath. To the cold mixture DCC (2.06 gr.) is added under stirring for 2 hours in the ice-bath and for 3 days at room temperature. The DCU which separates is filtered off and the filtrate is treated with an excess of water to give a solid which is washed on the filter thoroughly with 5% citric acid, water, 5% Na₂CO₃, water and dried to yield 18 gr. (96%) of the above-titled product; m.p.=200–203° dec.; $[\alpha]_D^{25}=-5.6$ (c. 0.5, DMF); $R_f$ (CHCl₃-MeOH, 10:1) 0.65; $R_f$ (CHCl₃-MeOH-AcOH, 85:10:5) 0.83.

*Analysis.*—Calc. for $C_{107}H_{121}N_{11}SO_{18}H_2O$ (1181.04); C, 67.60; H, 6.52; N, 8.10. Found: C, 67.31; H, 6.60; N, 8.46.

EXAMPLE 21

L-phenylalanyl-L-phenylalanyl-L-tryptophyl - Nᵉ - benzyloxycarbonyl-L-lysyl-O-benzyl-L-threonyl-L - phenylalanyl-O-benzyl-L-threonyl-O-benzyl-L-Seryl-S- p - methoxybenzyl-L-cysteine benzyl ester trifluoroacetate BOC-Phe-Phe-Trp-Lys(Chz)-Thr(Bzl)-Phe - Thr(Bzl)- Ser(Bzl)-Cys(SMBzl)OBzl (3 gr., 1.6 mmoles) of Example 20 is mixed with anisole (2 ml., ca. 32 mmoles) and then an excess of trifluoroacetic acid is added. The solution is left to stand at room temperature for 1 hour then evaporated to dryness and the residue triturated with dry Et₂O to afford a solid in a yield of 2.8 gr. (92%) of the above-titled product; $R_f$ (chloroform-methanol-acetic acid, 85:10:5) 0.50; $R_f$ (chloroform-methanol, 10:1) 0.55, traces at 0.25; Ninhydrin and I₂ positive spots.

Amino acid analysis: [1] Thr (2) 1.97; Ser. (1) 0.76; Phe (3) 3.00; Lys (1) 0.90.

EXAMPLE 22

N-tert-butyloxycarbonyl-L-alanyl-glycyl - S - p - methoxybenzyl-L-cysteinyl-Nᵉ-benzyloxycarbonyl-L - lysyl - L-phenylalanyl-L-phenylalanyl-L-tryptophyl - Nᵉ - benzyloxycarbonyl-L-lysyl-O-benzyl-L-threonyl-L - phenylalanyl-O-benzyl-L-threonyl-O-benzyl-L-seryl - S - p - methoxybenzyl-L-cysteine Phe-Phe-Trp-Lys(Cbz)-Thr(Bzl)-Phe-Thr(Bzl) - Ser-(Bzl)-Cys(SMBz)OBzl:TFA (2.5 gr., 1.3 mmoles) of Example 21 is dissolved in dimethylformamide (ca. 50 ml.) and treated with triethylamine (0.177 ml.). The pH is ca. 7 then N-hydroxysuccinimide (173 mg., 1.5 mmoles) is added followed by BOC-Ala-Gly-Cys (SMBzl) - Lys(Cbz)OH (0.95 gr., 1.3 mmoles) of Example 6. The mixture is cooled in an ice-bath and then treated with DCC (0.31 gr., 1.5 mmoles) for two hours in ice-bath and for 3 days at room temperature. The DCU which separates is filtered off and the filtrate is treated with an excess of water to give a white solid precipitate which is collected and washed with water, ethanol, methanol and Et₂O to yield 2.23 gr. (69%) of the above-titled product; m.p. 240–252° dec.; $[\alpha]_D^{26}=-10.6$ (Cl, DMF).

---

[1] Numbers in brackets indicate the theoretical quantity of the amino acids.

*Analysis.*—Calc. for $C_{137}H_{160}N_{16}S_2O_{25}$ (2494.65); C, 65.96; H, 6.46; N, 8.98. Found: C, 62.62; H, 6.25; N, 8.59.

Calc. for heptahydrate ($7H_2O$): C, 62.78; H, 6.69; N, 8.55.

EXAMPLE 23

L-alanyl-glycyl-L-cysteinyl-L-lysyl - L - phenylalanyl - L-phenylalanyl-L-triptophyl - L - lysyl - L - threonyl - L-phenylalanyl-L-threonyl-L-seryl - L - cysteine triacetate salt BOC-Ala-Gly-Cys(SMBzl)-Lys(Cbz)-Phe - Phe - Trp-Lys(Cbz)-Thr(Bzl) - Phe - Thr(Bzl) - Ser(Bzl) - Cys-(SMBzl)-OBzl (1.5 gr., 0.6 mmole) of Example 22 is mixed with anisole (6 ml.) and treated with liquid HF for 30 minutes at room temperature. The excess liquid HF is removed under high vacuo and the residue is partitioned between 1% AcOH and $Et_2O$. The aqueous phase is lyophilized to afford a white fluffy matetrial in a yield of 920 mgr. (90%) of the above-titled product. A portion of this material (320 mgr.) is applied onto a Bio-Gel P–2 column (2.5 x 90 cm.) and eluted with 0.2 N-AcOH containing 0.3% v./v. mercaptoethanol. The fractions between 1.25–2.5 void volumes appear as a single peak on monitoring their absorbance at 278 m./u. and they are pooled and lyophilized to give a white fluffy compound in a yield of 215 milligrams. $[\alpha]_D^{26} = -25$ (c. of 0.42, 10% AcOH).

Amino acid analysis:[2] Thr (2) 1.80; Ser (1) 0.6; Gly (1) 0.83; Ala (1) 0.85; Phe (3) 3.1; Lys (2) 2; Trp (1) 0.80.

$R_f$ (EtoAc-pyridine-AcOH-water, 5:5:1:3) 0.75.

EXAMPLE 24

Ala-Gly-Cys-Lys-Phe-Phe-Trp-Lys-Thr-Phe-Thr-Ser-Cys-OH

Ala - Gly - Cys - Lys - Phe - Phe - Trp - Lys - Thr-Phe-Thr-Ser-Cys-OH (167 mg.) obtained in Example 23 is dissolved in 1.6 liters of water and then brought to pH 7.2 with a few drops of acetic acid and 1 $N-NH_4OH$. The water used for this solution is flushed with nitrogen. The solution is left to stand for 3 days in the open air then lyophilized. The white fluffy solid which is obtained is chromatographed through a partition column equilibrated with the lower phase and the upper phase of the biphasic system n-butanol-water-glacial acetic acid (4:5:1, v./v.). The fractions 60–73 (void volume 136 ml., fraction size 4.8 ml.) are pooled and lyophilized to yield 36 mg. of the above-titled product. $[\alpha]_D^{26} = -29.4$ (c. 0.455, 10% AcOH).

$R_f$ (n-butanol-water-acetic acid, 4:5:1) 0.55.

$R_f$ (ethylacetate-pyridine-water-acetic acid, 5:5:3:1) 0.70.

Amino acid analysis:[3] Thr (2) 1.80; Ser (1) 0.73; Gly (1) 0.91; Ala (1) 0.88; Cys (2) 1.49; Phe (3) 3; Lys (2) 2.01; Trp (1) not determined.

The growth hormone release inhibiting activity of the compound of Examples 23 and 24 was determined by radioimmunoassay in a rate pituitary cell culture system as described by Vale et al., Endocrinology, *91*, pp. 562 (1972) and Grant et al., Biochemical and Biophysical Research Communications, *51*, pp. 100–106 (1973). The compound of Example 23 was found active in inhibiting growth hormone release at a concentration as low as 25 mg./ml. and that of Example 24 was tested at a concentration as low as 5 μg./ml. and found active in inhibiting growth hormone release.

The compounds of formulas I and II described herein may be administered to warm blooded mammals, including humans, either intravenously, subcutaneously, intramuscularly or orally to inhibit the release of growth hormone where the host being treated requires therapeutic treatment for excess secretion of somatotropin which is associated with conditions such as juvenile diabetes and acromegaly. The contemplated dose range for oral administration in tablet or capsule form to large mammals is about 0.015 mg. to about 7 mg./kg. of body weight per day while the dose range of intravenous injection in an aqueous solution is about 0.1 g. to about 0.15 mg./kg. of body weight per day. When administered subcutaneously or ultramuscularly a does range of about 1.5 g. to about 7 mg./kg. of body weight per day is contemplated. Obviously, the required dosage will vary with the particular condition being treated, the severity of the condition and the duration of treatment.

If the active ingredient is administered in tablet form the tablet may contain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

FLOW DIAGRAM

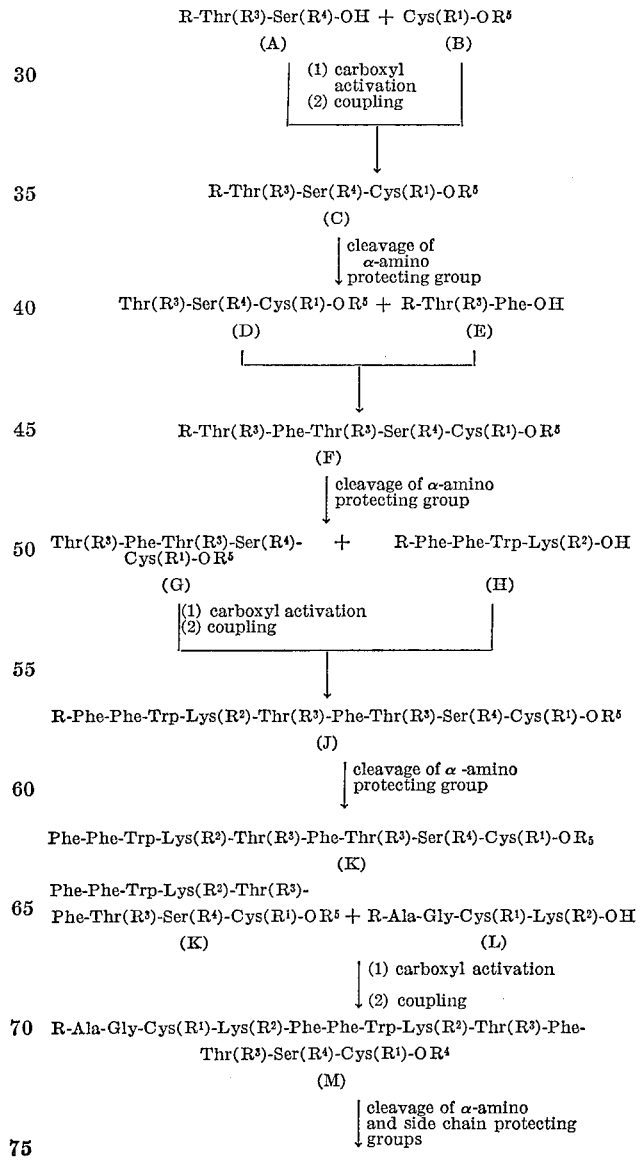

---

[2] See footnote 1, column 10.
[3] See footnote 1, column 10.

Ala-Gly-Cys-Lys-Phe-Phe-Trp-Lys-Thr-Phe-Thr-Ser-Cys-OH (I)

↓ oxidation

Ala-Gly-Cys-Lys-Phe-Phe-Trp-Lys-Thr-Phe-Thr-Ser-Cys-OH (II)

What is claimed is:

1. A compound selected from those of the formula:

H-Ala-Gly-Cys-Lys-Phe-Phe-Trp-Lys-Thr-Phe-Thr-Ser-Cys-OH,

H-Ala-Gly-Cys-Lys-Phe-Phe-Trp-Lys-Thr-Phe-Thr-Ser-Cys-OH and the non-toxic acid addition salts thereof, said amino acid residues having an asymmetric α-carbon atom being of the L-form.

2. A compound according to claim 1 which is: L-alanylglycyl - L - cysteinyl - L - lysyl-L-phenylalanyl-L-phenylalanyl - L - tryptophyl-L-lysyl-L-threonyl-L-phenylalanyl-L-threonyl-L-seryl-L-cysteine and a non-toxic acid addition salt thereof.

3. A compound of the formula:

R-Ala-Gly-Cys($R^1$)-Lys($R^2$)-Phe-Phe-Trp-Lys($R^2$)-Thr($R^3$)-Phe-Thr($R^3$)-Ser($R^4$)-Cys($R^1$)-$OR^5$ wherein:
R is selected from the group consisting of hydrogen or an α-amino protecting group;
$R^1$ is a protecting group for the sulfhydryl group on the cysteinyl amino acid residue;
$R^2$ is selected from the group consisting of hydrogen and a protecting group for the side chain amino substituent of the lysine residue;
$R^3$ and $R^4$ are protecting groups for the alcoholic hydroxyl group of the threonine and serine residues; and
$R^5$ is a α-carboxyl protecting group selected from the class consisting of $C_1$–$C_6$ alkyl, benzyl, substituted benzyl, phenacyl, phthalimidomethyl, 3-methylthioethyl, 4-picolyl and 4-(methylthio) phenyl, said substituent on benzyl being selected from at least one of methyl, methoxy and nitro; with the further proviso that said α-amino protecting group defined by R is not the same as any of the protecting groups defined by $R^1$, $R^2$, $R^3$, $R^4$ and $R^5$; and the acid addition salts thereof, said amino acid residues having an asymmetric α-carbon atom being of the L-form.

4. A compound according to claim 3 wherein R is *tert*-butyloxycarbonyl.

5. A compound according to claim 4 wherein $R^1$ is p-methoxybenzyl, $R^2$ is benzyloxycarbonyl, $R^3$ and $R^4$ are benzyl and $R^5$ is benzyl.

References Cited

Brazeau et al.: Science, *179*, 77–9 (1973), cited from Chem. Abstr. *78*:79972k.

LEWIS GOTTS, Primary Examiner

R. J. SUYAT, Assistant Examiner

U.S. Cl. X.R.

424—177